Patented Nov. 8, 1938

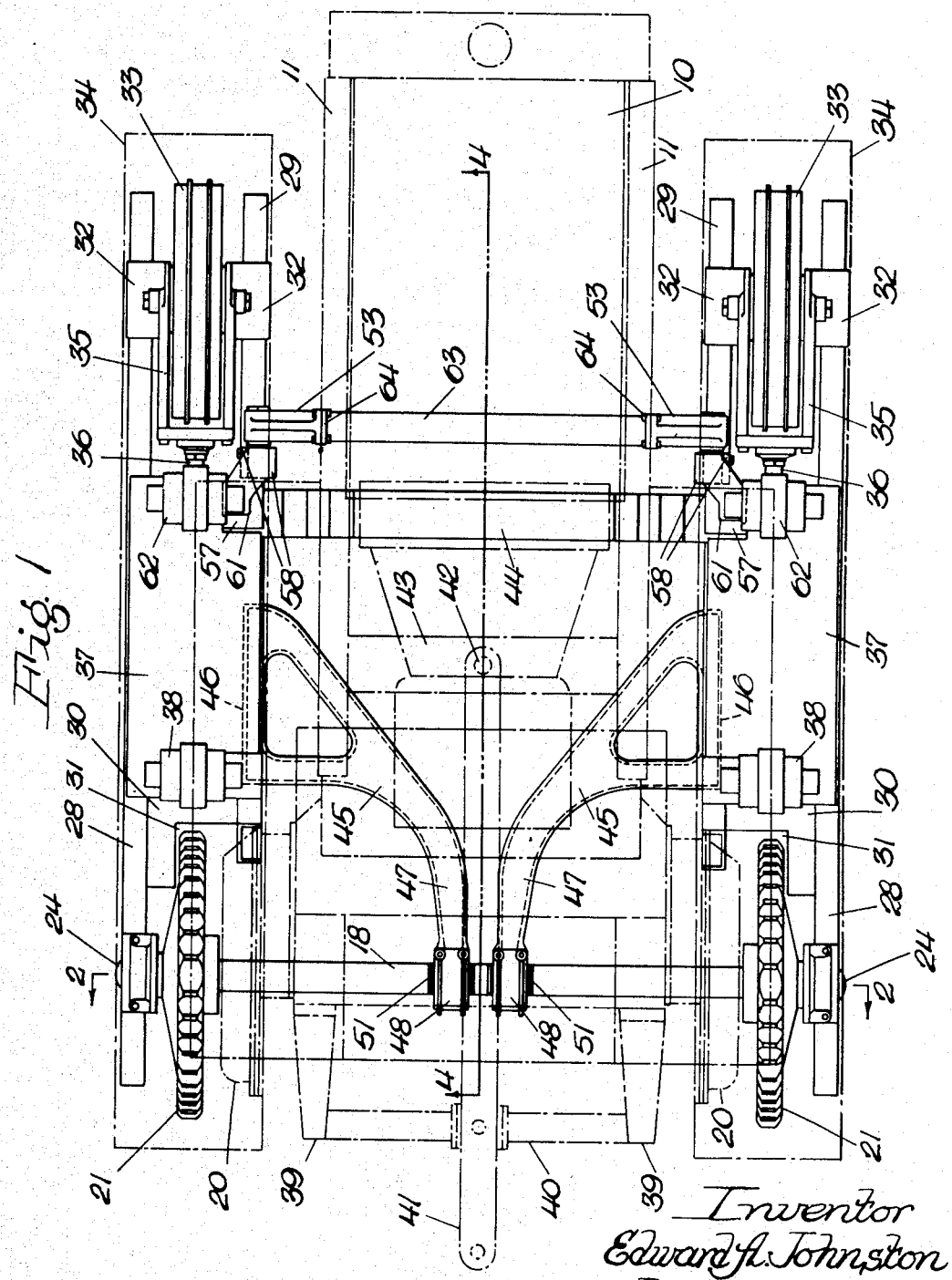

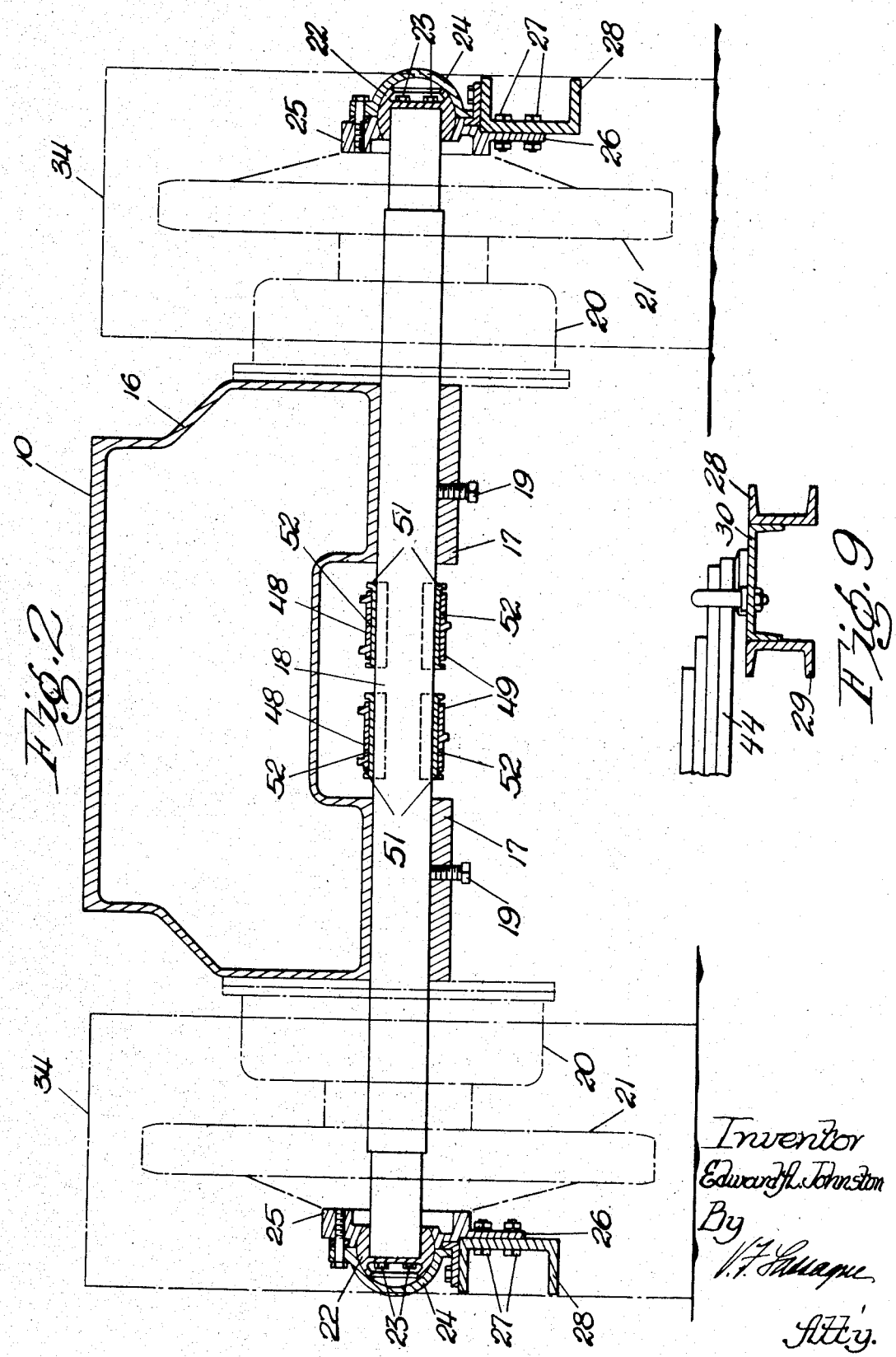

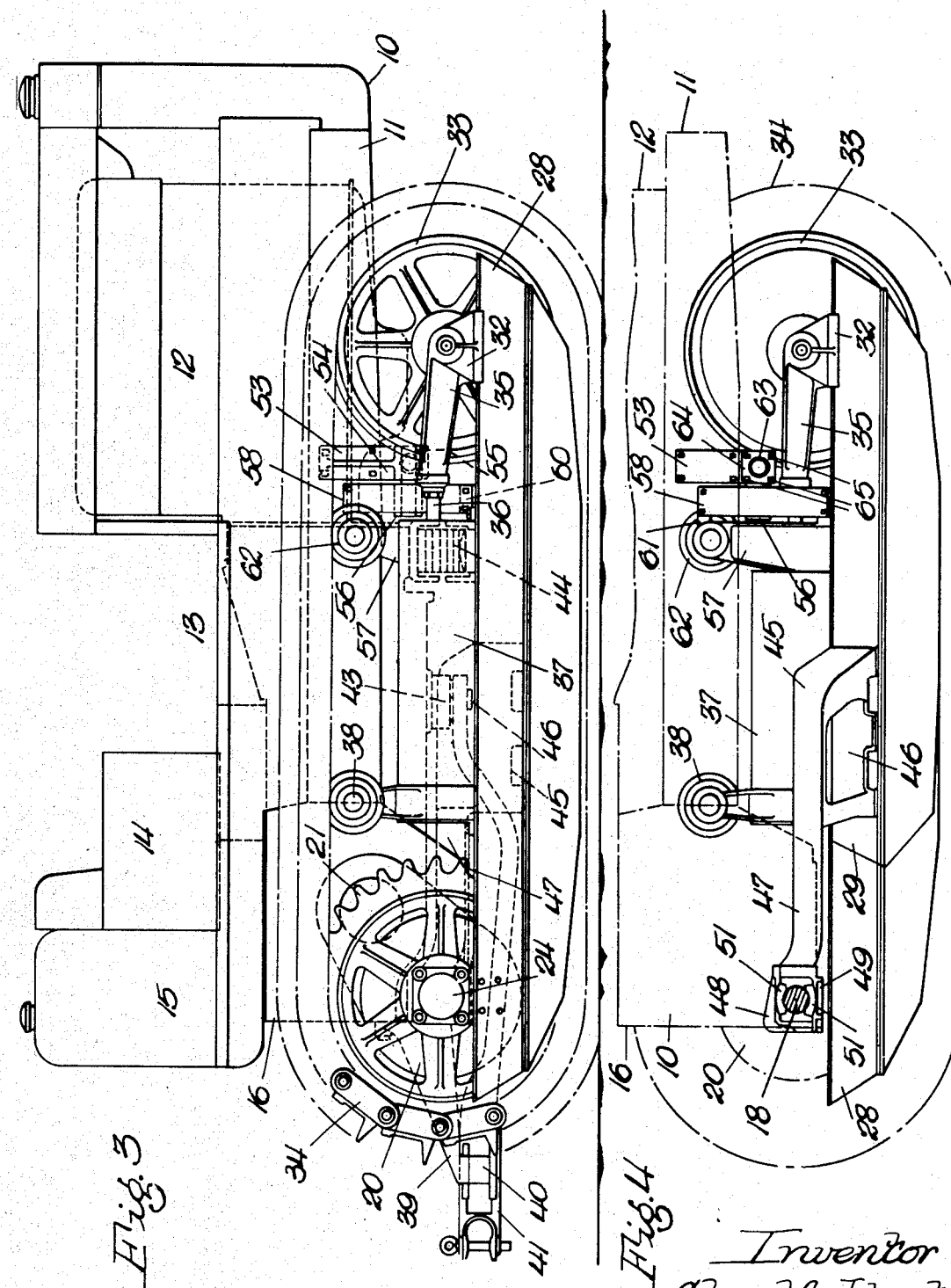

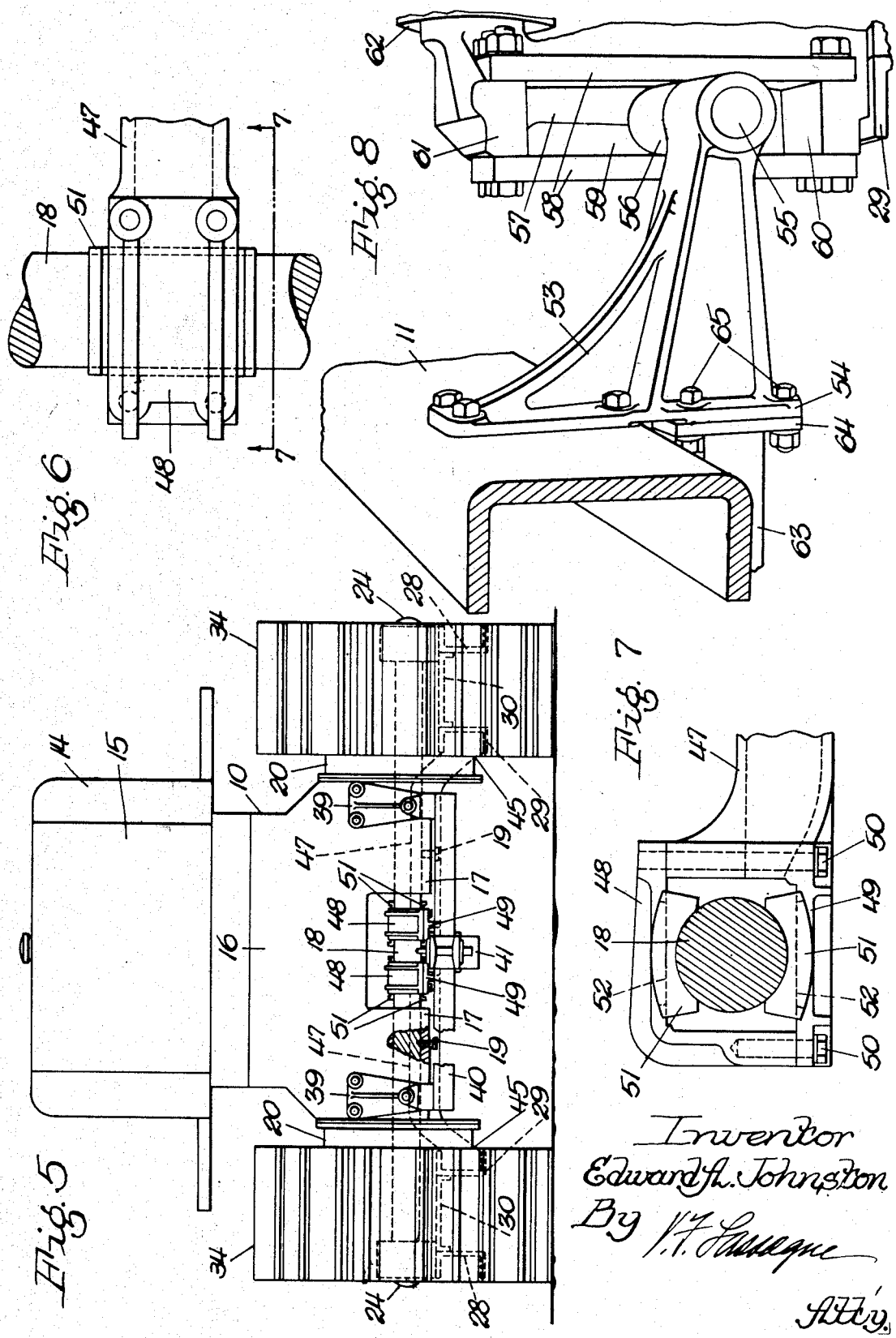

2,135,619

UNITED STATES PATENT OFFICE 2,135,619

STABILIZER FOR TRACK TYPE TRACTORS

Edward A. Johnston, Chicago, Ill., assignor to International Harvester Company, a corporation of New Jersey Application November 23, 1936, Serial No. 112,255

33 Claims. (Cl. 180—9.1)

The invention relates to track type tractors and particularly to an improved stabilizer and brace mechanism for stabilizing and controlling the movements of the opposite side track frames on which the body of the tractor is carried.

The track type tractor for which the improved mechanism is provided is of the type having a longitudinal central body, at the rear end of which is carried a transverse dead axle, to the opposite ends of which, respectively, are pivotally connected longitudinally extending track side frames. These track side frames extend forwardly along opposite sides of the main body of the tractor, and across a forward portion thereof is disposed an equalizer in the form of a spring having its opposite ends respectively resting freely on the tops of said side frames with an intermediate portion of said equalizer spring connected to a forward portion of the body of the tractor to support the weight of the forward portion of the body of the tractor equally divided between said two track side frames. The construction is such as to provide the well known three-point form of suspension of the tractor body on the track side frames.

The rear dead axle described at each end carries final drive mechanism in the form of a track driving sprocket wheel, around which is trained an endless track belt, the forward loop of which belt envelopes an idler guide wheel carried at the forward end of each of said track frames. As the tractor moves over uneven ground, the track frames at their forward ends rise and fall about the pivot therefor at the rear end of the track frames, the three-point suspension serving to cause the body of the tractor to ride level without being twisted and strained when the tractor is operating over uneven ground.

It is important that the rising and falling movements of these track frames be constrained to vertical movement and for that reason it has been proposed to provide so-called stabilizers connected between the body and the track side frames, to enable the track frames to rise and fall freely in a vertical plane, but to prevent the track frames from toeing in or out at their forward ends.

Where the track frames comprise side members, the outer one of which is longer than the inner one, and where the outer one serves to form the only point of pivotal connection of a track frame to the rear dead axle, and where such only point of connection is in the form of a ball or universal joint to provide flexibility in a transverse direction, then a real problem is involved, and it is desirable that torque brace means be associated with the rear dead axle and having some freedom of movement to compensate for any twisting strains developed in the track frames, but still to make possible the control of the track frames for as nearly true vertical movement as possible under the circumstances. Also, where stabilizing mechanism on opposite sides of the body of the tractor is associated with the forward ends of the respective side track frames, a further stabilizing problem is encountered and it becomes necessary that some freedom of movement be provided at the connection of the inner ends of the rear torque members with the said rear disposed dead axle. Also, to control the forward stabilizers, it is desirable that they be cross connected, to make for as true up and down movements of the track frame as is possible to achieve, considering their ball joint connection with the rear dead axle about which they rise and fall as an axis.

This stabilizing function also serves to resist strains developed when the tractor is steered. With these problems in mind, the invention particularly relates to improvements in stabilizer mechanisms for crawler tractors of the type above generally described.

The main object of the invention is to provide an improved stabilizer mechanism for the purpose stated.

Another object of the invention is to provide an improved form of torque control means for the track frames associated with the rear ends of the track frames to provide a bifurcated structure in the track frame, one leg of which is universally connected to the rear dead axle at the outer end of the bifurcated structure, and the inner end of said bifurcated structure is connected to said dead axle for pivotal as well as sliding movements.

Another object of the invention is to provide an improved form of roller and slide stabilizer for the front ends of the side track frames in relation to the adjacent sides of the body and to cooperate with the rear torque members for control of the track frame movements.

Another object of the invention is to crossbrace this front stabilizer structure in an improved manner.

Other important objects will become apparent to those skilled in this art as the disclosure is more fully made.

These desirable objects may be achieved in the form of the invention herein to be disclosed and constituting one practicable example of the invention. In such form of the invention each side track frame has an inner side and an outer side with each outer side being longer than the inner side, so that where the inner side of the track frame carries a rearwardly and inwardly diagonal A frame torque brace or bracket, said bracket with the outer side of the track frame forms a bifurcated member providing a space in which may be located a final track drive mechanism. The outer leg of the track frame is connected by a ball joint to the dead axle and the inner end of the A frame, or diagonal bracket part, is pivotally and slidably connected to the same rear dead axle. The body of the tractor, forwardly of these A frame members, carries a bracket at each side, which, underneath the body, is cross-connected by a brace, and each bracket extends laterally outwardly to carry a roller, which is located in a vertically slotted bracket carried on the front end of each side track frame, so that, as the side track frames rise and fall, the rollers serve to guide the track frames at their front ends for true vertical movement. So much will suffice to give a general idea of the structure which is shown in detail in the accompanying sheets of drawings, wherein:

Figure 1 is a general plan view of the tractor with the main body portion shown in dotted lines clearly to show the improved track frame control and stabilizing mechanism of this invention;

Figure 2 is a transverse sectional view through the tractor, taken along the line 2—2 of Figure 1, looking in the direction of the arrows;

Figure 3 is a general side elevational view of the tractor;

Figure 4 is a fragmentary side elevational view of the tractor, partly in section, taken along the section line 4—4 of Figure 1, looking in the direction of the arrows;

Figure 5 is a rear elevational view of the tractor;

Figure 6 is an enlarged detail, plan view of the slide connection of a rear torque control member to the dead axle;

Figure 7 is a side elevational view of the same detail taken along the line 7—7 of Figure 6, looking in the direction of the arrows;

Figure 8 is an enlarged perspective view of the roller and slide stabilizer connection between the body and side track frame; and Figure 9 is a detail view in elevation showing an end of the equalizer resting slidably on a track frame.

The tractor has a longitudinally disposed main frame or body 10 comprising opposite longitudinal side channel sills 11, said body at its front end, in the usual manner, carrying a motor 12, to the rear of which is an operator's compartment 13 having a seat 14 at its rear end and a fuel tank 15 behind the seat, all carried on said body or main frame 11. The rear end of said body comprises a rear transmission box 16 having two depending bracket portions 17 at opposite ends, to provide a transverse journal for carrying a heavy transverse dead axle 18, which is secured in said journal brackets 17 by means of set screw bolts 19. The opposite sides of the transmission box 16 of the body carry the usual opposite side housings 20 for final drive parts to drive opposite track drive sprocket wheels 21 journaled for rotation at the outer ends, respectively, of the dead axle 18, the ends of said dead axle 18 projecting on through outwardly beyond each outer face of each track sprocket wheel 21.

As best shown in Figure 2, each outer end of the dead axle 18 carries a fixed ball member 22 secured to the axle ends by bolts 23, and, turnable about said ball element 22, is a socket bracket element 24 to which is secured a complementary piece 25 turning with element 24, said piece 25 including a depending extension 26 which is secured by bolts 27 to the track side frame channel 28.

This brings us to the side track frame structure, which, as indicated in dotted lines Figure 5, comprises the outer channel member 28 and the inner, parallel, side track channel member 29, the two being cross-connected by a top channel plate 30. Thus, each track frame comprises two longitudinal, spaced, channel sills 28 and 29 and a top channel 30, connecting them to form the track frame, with the outer channel 28 extending rearwardly a substantial distance beyond the rear end of the inside channel sill 29. There is thus provided a space 31 for the track drive sprocket wheels 21.

These track frames are disposed oppositely and respectively on each side of the body 10 and extend forwardly alongside the body, as shown, with the front end of each track frame carrying a journal slide block 32 in which is journaled a front idler guide wheel 33. On each side of the tractor is disposed the usual endless track belt 34 driven from its respective track drive sprocket wheel 21, around which the belt is wrapped at its rear end, and at their forward ends said belts are looped around the guide wheels 33 in a manner well understood in this art to envelope the track frames.

Each journal slide box 32 includes a fork 35, or yoke, which terminates in an adjusting bolt 36 disposed longitudinally and extending rearwardly over the top side 30 of the respective side track frames, and which bolt extends into a housing 37 carried over the side track frames. Hidden behind said housing 37 is the usual compression recoil spring, well known in this art, which serves to hold the idler 33 in a fixed position on the front end of the side track frame to hold the track belt properly tensioned. At the rear end of said housing structure 37 is an idler 38 to support the upper run of the track belt 34. The rear end of the transmission box 16 forming part of the body 10 carries rearwardly extending, oppositely disposed brackets 39 carrying between them a transverse draw-bar support 40 on which is carried for transverse sliding movement a rearwardly extending draw-bar 41, the forward end of said draw-bar being pivotally connected to a vertical pivot pin 42 carried by a bracket structure 43 underneath a forward portion of the box 16, or other suitable point on the body 10.

A transverse equalizer spring 44 is disposed underneath a forward portion of the body 10 of the tractor at a point just behind the idler wheels 33, which equalizer spring, in a well known manner, has its opposite ends resting for free sliding movement on the top sides 30 of the track frames. The middle portion of said spring in the usual manner has a load supporting connection with underside of the body 10, whereby to distribute equally to said side track frames the weight of the forward portion of the tractor body 10. It can now be seen that, through the intermediary of the equalizer bar and the two ball joints 22, the body 10 is supported on the track side frames at three points of support, which mounting, in the well recognized manner, permits the forward ends of the track frames to rise and fall pivotally about the rear end pivot connection of the track frames to the dead axle 18 to enable the tractor to operate over uneven ground without unduly twisting the main frame or body.

Because of the ball joint connection 22 for the rear ends of the respective track frames, there is permitted in this construction a slight rocking or sidewise movement of each track frame in addition to its pivotal up and down movement, thereby eliminating twisting strains from being imparted to the rear dead axle and to the final drive mechanism carried thereby. Also, there is a tendency in these track type tractors for the forward ends of the track frames to move laterally in and out, which is objectionable. So that all of these movements in and out may be controlled when the tractor is steered and also when moving over uneven ground to insure as nearly as possible a true vertical rising and falling movement of the side track frames, this invention provides improved torque control and stabilizer mechanism which will now be described.

On the inner side of each track frame, along the inner channel 29 thereof, just forwardly of the rear ends of said inner channels 29, is rigidly carried an inwardly and diagonally disposed bracket 45, which bracket is preferably a hollow, cast member providing a substantially enlarged triangular portion at its forward end to create a broad base or face 46 for attachment in any suitable manner to the inner face of the adjacent inner channel 29 of the side track frame. This connection preferably is by means of welding, although it may be a riveted or bolted connection, if desired, the main requirement being that the connection be rigid. This relatively enlarged, triangular portion of the front end of the bracket is provided with a large opening to let dirt fall through, the bracket sides gradually merging inwardly and diagonally into a narrow, hollow gooseneck extension 47, which, at its rear end, as best shown in Figures 1, 6 and 7, carries upper and lower clamp brackets 48 and 49, respectively, held together by bolts 50 and rigidly secured to the rear end of said extension 47. This clamp structure 48—49 embraces a mid-portion of the dead axle 18, as shown in Figure 1, there being provided upper and lower wear plates 51 between the brackets and the axle, so that the upper and lower slide surfaces 52 are provided between the wear plates and the brackets. Thus, the leg extension 47 of each bracket 45, by means of the structure shown in Figure 7, can have slight fore and aft shifting movement on the wear surface 52, should strains develop in the side track frames to such an extent as to require such movement to prevent distortion of the rear dead axle 18 or any other parts of the structure. It is to be noted that this rear bracket or A frame torque arm structure 45 is provided for each track frame 30 and that each bracket 45 is similarly associated with each track frame and that they each extend rearwardly and diagonally inwardly, and that each extension 47 has an independent pivotal and slidable connection with the dead axle 18. It will further be noted that each extension 47 forms with the rearwardly extending outside channel 28 of each side track 30 a bifurcated rear end side track frame structure, so that each side frame, by means of this bifurcated arrangement, has two widely spaced apart points of connection to the rear dead axle 18.

At a point immediately forwardly of the equalizer bar 44, each side channel 11 of the body 10 has rigidly secured thereto a downwardly and outwardly extending bracket 53 including a depending portion 54, as shown in Figure 8, extending below the body part 11. Each bracket 53 at its outer end carries a longitudinal pin 55, at the front end of which, outside the bracket, is carried a roller 56. This roller 56 is disposed above the adjacent track frame 30. Each track frame carries a bracket 57 including spaced vertical plates 58, forming between them a vertical guide slot 59 in which the roller 56 has relative up and down movement, the bracket 57 including a lower stop 60 and an upper stop 61 to prevent the roller from riding out of the slot 59. The upper stop 61 includes an extension for mounting an idler roller 62 to support a forward portion of the upper run of a track belt 34. It will be understood that the guide slot structure 58—59 is carried on each track frame 30 and that on each side of the body 10 is fixed a bracket carrying a roller 56 cooperating with said guide slot 59, whereby, as the track frames at their front ends rise and fall, the rollers 56 move in the slots 59 to hold the forward ends of the track frames 30 for true vertical movement, thus preventing the track frames from toeing in or spreading out. So that the bracket structure 53—54 will be as rigid as possible, a cross-connector member in the form of a hollow shaft or bolster 63 is disposed transversely underneath the body 10 in a position in advance of the equalizer bar 44, said bolster having end flanges 64 secured by bolts 65 firmly to the adjacent bracket portion 54. This concludes the detailed description of the improved track frame torque control and stabilizer mechanism.

As the tractor traverses uneven ground, the track frames 30 are permitted a free rising and falling movement in a pivotal manner by means of their ball joint connection 22 to the rear dead axle 18. The roller and slide stabilizing connections 56 and 58 at the forward ends of the side track frames serve to control their movement at their front ends for substantially true vertical movement, thereby preventing the side track frames from toeing in or spreading at their forward ends. Such control is also effective when the tractor is being steered. In conditions where the track frames at their rear ends should become severely strained, the ball joint connection 22 and 24 enables the rear ends of the track frames to have a slight lateral movement in a universal manner, to prevent undue straining of the dead axle 18 or other parts. Obviously, it would not do to twist this shaft 18 under such circumstances, and the ball joint definitely insures that the shaft will not become distorted under strains imparted to it by the rear end of the track frame 30. Further, the rear torque control members comprising the brackets 45 serve to control the movement up and down of the rear portions of the track frames 30, and, to prevent further distortion and wear of the rear dead axle 18, the leg extensions 47 of said brackets 45 are connected to said axle 18 in a manner to enable them to have not only pivotal movement in relation to the shaft 18, but also some fore and aft sliding movement. This sliding movement is on the wear surface 52 between the brackets 48 and 49 and the wear plates 51. Under this sliding and pivotal movement, should any wear take place, it will be on the plates 51 and not on the shaft 18 or members 47. The plates 51 are easily replaceable after they have become worn, and thus the shaft 18 is saved from wear, which is a highly desirable feature. The sliding movement of the A frame members 45 in relation to the axle 18 also serves to provide the necessary lost motion under all conditions of use, which will prevent the axle 18 from becoming distorted or thrown out of line, thereby insuring true operation of the final drive mechanism 21. Thus, it will be seen that the forward stabilizers comprising the roller and slide co-operate with the rear A frame brackets 45 to make for complete controlled movement of the track frames 30, so that they will operate in a manner over uneven ground and when the tractor is steered without distorting the main frame, track frames, or other parts and saving the rear dead axle 18 from distortion and undue wear.

It is the intention to cover all changes and modifications of the example of the invention herein shown which do not in material respects constitute departures from the spirit and scope of the appended claims.

What is claimed is:

1. In a track type tractor having a longitudinal body, pivot means mounted in said body near its rear end, and a pair of longitudinally disposed track frames journaled on said pivot means and disposed respectively at the sides of the body, the combination with said frames each having two widely spaced points of connection to the pivot means including diagonally disposed brackets each having a wide end rigidly secured respectively to a track frame at its inner side only to brace the frame and extending inwardly, and means associated with the inner ends of the brackets for respectively and individually connecting said inner ends to the pivot means for an appreciable amount of fore and aft positively guided sliding movement.

2. In a track type tractor having a longitudinal body, a transverse shaft mounted in said body near its rear end, and a pair of longitudinally disposed track frames journaled on said shaft and disposed respectively at the sides of the body, the combination with said frames of bracket members rigidly secured at one end respectively to a track frame at its inner side and extending diagonally inwardly with their inner ends respectively and individually connected to said shaft, said members carrying a clamp fixture for pivotally connecting the members to the shaft, and means included in the fixture whereby said members may slide fore and aft relative to the shaft.

3. In a track type tractor having a longitudinal body, a transverse shaft mounted in said body near its rear end, and a pair of longitudinally disposed track frames journaled on said shaft and disposed respectively at the sides of the body, the combination with said frames of a bracket rigidly secured at one end respectively to a track frame at its inner side and extending diagonally inwardly with their inner ends respectively and individually connected to said shaft, said brackets respectively carrying a clamp for pivotally connecting the brackets to the shaft, and replaceable wear means included in the clamp whereby the bracket may shift fore and aft as well as pivotally without causing wear on the shaft.

4. In a track type tractor having a longitudinal body, pivot means mounted in said body near its rear end, and a pair of longitudinally disposed track frames journaled on said pivot means and disposed respectively at the sides of the body, the combination with said frames each having two widely spaced points of connection to the pivot means including torque brackets having one end providing a wide attaching surface rigidly secured respectively to a track frame at its inner side only and extending inwardly with their inner ends respectively and individually pivotally connected to said pivot means, one of said points of connection for each track frame to the pivot means including means also providing for an appreciable amount of positively guided fore and aft shifting movement.

5. In a track type tractor having a longitudinal body, a transverse shaft mounted in said body near its rear end, and a pair of longitudinally disposed track frames each journaled on said shaft pivotally at widely spaced points and disposed respectively at the sides of the body, the combination with said frames of torque brackets rigidly secured at one end respectively to a track frame at its mid-portion and inner side only and extending diagonally inwardly with their inner ends respectively and individually connected to said shaft to provide one of the points of connection for the track frames to the shaft, one of said points of connection for each track frame having replaceable wear means providing for an appreciable amount of sliding fore and aft movement in relation to the shaft.

6. In a track type tractor, a longitudinal main frame having final drive mechanism at each side of said main frame and rotatable about an axis, a track frame at each side of the main frame, the combination with each track frame of means for connecting same for pivotal movement at two points about said axis comprising a bifurcated structure, one of said furcations having a load transmitting connection with said main frame and extending rearwardly and inwardly with respect to the longitudinal axis of the track frame to provide wide spacing between said furcations to accommodate the final drive mechanism therebetween, each said inwardly extending furcation, having associated with it means providing a connection having also fore and aft positively guided sliding movement of an appreciable amount relative to the axis about which it is connected.

7. In a track type tractor, a longitudinal main frame having final drive mechanism at each side of said main frame and rotatable about an axis, a track frame at each side of the main frame, the combination with each track frame of means for connecting same for pivotal movement at two points about said axis comprising a bifurcated structure, one of said furcations having a load transmitting connection with said main frame and being hollow and extending rearwardly and inwardly with respect to the longitudinal axis of the track frame to provide wide spacing between said furcations to accommodate the final drive mechanism therebetween, said inwardly extending furcation including at its rear end replaceable wear means providing for an appreciable amount of fore and aft sliding movement thereof relative to the axis about which it is pivotally connected.

8. In a track type tractor, a longitudinal main frame having final drive mechanism at each side of said main frame and rotatable about an axis, a track frame at each side of the main frame, the combination with each track frame of means for connecting same for pivotal movement at two points about said axis comprising a bifurcated structure, one of said furcations having a load transmitting connection with said main frame and extending rearwardly and inwardly with respect to the longitudinal axis of the track frame to provide wide spacing between said furcations to accommodate the final drive mechanism therebetween, said inwardly extending furcation having means providing for fore and aft sliding movement of said furcation relative to the axis about which it is pivotally connected, and the other furcation of each track frame having means providing said other furcation for universal movement in relation to said axis.

9. In a track type tractor having a longitudinal body, pivot means mounted in said body near its rear end, and a pair of longitudinally disposed track frames journaled on said pivot means and disposed respectively at the sides of the body, the combination with said frames of torque members rigidly secured at one end respectively to a track frame at its inner side and extending diagonally inwardly with their inner ends respectively and individually connected to said pivot means, means pivotally and slidably connecting the torque members to the pivot means, and means connecting the track frames to said pivot means for pivotal movement in a plurality of planes.

10. In a track type tractor, a longitudinal main frame having final drive mechanism at each side of said main frame and rotatable about a horizontal axis, a track frame at each side of the main frame, the combination with each track frame of means for connecting same for pivotal movement vertically at two spaced points about said axis comprising a bifurcated structure, one of said furcations extending inwardly with respect to the longitudinal axis of the track frame to provide wide spacing between said furcations to accommodate the final drive mechanism therebetween, one of said furcations having associated with it means providing for fore and aft sliding movement relative to the axis about which it is pivotally connected, and the other furcation including means providing for lateral rocking movement.

11. In a track type tractor, a longitudinal main frame having final drive mechanism at each side of said main frame and rotatable about a horizontal transverse shaft carried in the frame, a track frame at each side of the main frame, the combination with each track frame of means for connecting same for vertical pivotal movement at two points about said shaft comprising a bifurcated structure, one of said furcations extending rearwardly and inwardly with respect to the longitudinal axis of the track frame to provide wide spacing between said furcations to accommodate the final drive mechanism therebetween, said inwardly extending furcation having associated with it means providing for fore and aft sliding movement relative to the shaft about which it is pivotally connected, said last mentioned means embodying replaceable wear plates to save the shaft from wear.

12. In a track type tractor, a longitudinal main frame having final drive mechanism at each side of said main frame and rotatable about a transverse shaft carried in the frame, a track frame at each side of the main frame, the combination with each track frame of means for connecting same for vertical pivotal movement at two points about said shaft comprising a bifurcated structure, one of said furcations extending rearwardly and inwardly with respect to the longitudinal axis of the track frame to provide wide spacing between said furcations to accommodate the final drive mechanism therebetween, said inwardly extending furcation having associated with it lamp means including replaceable upper and lower wear plates engaging the shaft to save the shaft from wear, and the pivotal connection for the other furcation also having associated with it a pivot block mounted on the shaft to save the shaft from wear at the latter point.

13. In a vehicle, a transverse shaft, a longitudinally disposed track frame formed at its rear end to provide two furcations one of which extends longitudinally rearwardly and is connected to said shaft for both up and down pivotal movement as well as side-wise rocking movement and the other furcation extending diagonally rearwardly and away from the track frame and being connected at its rear end to said shaft for up and down pivotal movement and additionally for fore and aft shifting movement.

14. In a vehicle, a transverse shaft, a longitudinally disposed track frame formed at its rear end to provide two furcations one of which extends longitudinally rearwardly and is connected to said shaft for substantially universal pivotal movement and the other furcation extending diagonally rearwardly and away from the track frame and being connected at its rear end to said shaft for up and down pivotal movement and additionally for fore and aft shifting movement.

15. In a track type tractor having a longitudinal body carrying a rearwardly disposed transverse axle to which the rear ends of oppositely disposed side track frames are pivotally connected, a stabilizer torque brace connection between each side frame and rear axle, a transverse equalizer spanning the forward portions of the track frames below the body to support the latter, the combination with said body of a bracket secured to each side thereof adjacent the torque braces, said brackets depending below the body, a cross member disposed below the body and connected between said depending portions, said brackets extending transversely and carrying a roller at their outer ends above the track frames, and a bracket structure respectively carried on each track frame and providing a vertical guide in which the adjacent roller fits to stabilize the front ends of the track frames against lateral movement.

16. In a track type tractor having a longitudinal body carrying a rearwardly disposed transverse axle to which the rear bifurcated ends of oppositely disposed side track frames are pivotally connected, one furcation in each frame comprising a connection between the side frame and rear axle which is connected to said axle for vertical pivotal movement and longitudinal sliding movement, and the other furcation of which is connected to said axle for substantially universal pivotal movement, a transverse equalizer spanning the forward portions of the track frames below the body to support the latter, the combination with said body of a bracket rigidly secured to each side thereof adjacent the connection mentioned, said brackets extending transversely and carrying at their outer ends above the track frames a roller, and a bracket structure respectively carried on each track frame and providing a vertical guide for the adjacent roller to stabilize the front ends of the track frames against lateral movement.

17. In a track type tractor, a longitudinal main frame having final drive mechanism at each side of said main frame and rotatable about an axis, a track frame at each side of the main frame, the combination with each track frame of means for connecting same for pivotal movement at two spaced points about said axis comprising a bifurcated structure, one of said furcations extending rearwardly and inwardly with respect to the longitudinal axis of the track frame to provide wide spacing between said furcations to accommodate the final drive mechanism therebetween, said inwardly extending furcation having associated with it means providing also for fore and aft sliding movement relative to the axis about which it is pivotally connected, means supporting the load of the forward portion of the main frame equally on the forward portions of the track frames, and stabilizer connections respectively between the main frame and track frames adjacent said forward load support means to prevent lateral deflection of the forward ends of the track frames.

18. In a track type tractor, a longitudinal main frame having final drive mechanism at each side of said main frame and rotatable about a transverse shaft, a track frame at each side of the main frame, the combination with each track frame of means for connecting same for pivotal movement at two points about said shaft comprising a bifurcated structure, one of said furcations extending rearwardly and inwardly with respect to the longitudinal axis of the track frame to provide wide spacing between said furcations to accommodate the final drive mechanism therebetween, said inwardly extending furcation having associated with it means providing also for fore and aft sliding movement relative to the shaft to which it is pivotally connected, the other furcation of each track frame being also connected to said shaft for sidewise rocking movement, means supporting the load of the forward portion of the main frame equally on the forward portions of the track frames, and stabilizer connections respectively between the main frame and track frames adjacent said forward load support means to prevent lateral deflection of the forward ends of the track frames.

19. In a track type tractor having a longitudinal central body with a track frame longitudinally disposed at each side thereof and connected to a rear disposed transverse shaft on the body for relative up and down swinging movement, a transverse equalizer carrying the forward weight of the body on the track frames, the combination with said track frames of torque control means comprising a diagonal brace rigidly connected respectively to the inner side of each track frame along a relatively wide surface to the rear of the equalizer, said braces extending inwardly and respectively having means for pivotal and slidable connection on said shaft of the inner ends thereof independently of each other, said sliding connection being operative in a fore and aft direction, and a stabilizer for the forward ends of the track frames comprising a slide connection between each frame and the body forwardly of the equalizer and operative in an up and down direction.

20. In a track type tractor having a longitudinal central body with a track frame longitudinally disposed at each side thereof and connected to a rear disposed transverse shaft on the body for relative up and down swinging movement, a transverse equalizer carrying the forward weight of the body on the track frames, said track frames formed at their rear ends respectively to provide two furcations one of which extends longitudinally rearwardly and is connected to said shaft by means providing for both up and down pivotal movement and sidewise rocking movement and the other furcation extending diagonally rearwardly and away from the track frame and provided with means connecting it at its rear end to said shaft for up and down pivotal movement and for fore and aft shifting movement, said bifurcated rear ends of the track frames being disposed rearwardly of the equalizer, and stabilizer means for the forward ends of the track frames comprising a slide connection between each frame and the body forwardly of the equalizer and operative in an up and down direction.

21. In a track type tractor having a longitudinal central body with a track frame longitudinally disposed at each side thereof and connected to a rear disposed transverse shaft on the body for relative up and down swinging movement, a transverse equalizer carrying the forward weight of the body on the track frames, said track frames formed at their rear ends respectively to provide two furcations one of which extends longitudinally rearwardly and is connected to said shaft by means providing for universal hinging movement and the other furcation extending rearwardly and inwardly away from the track frame and provided with means connecting it at its rear end to said shaft for pivotal and longitudinal sliding movement, and stabilizer means for the forward ends of the track frames comprising a connection between each track frame and the body ahead of the equalizer to allow free up and down parallel movement of the track frames.

22. In a crawler tractor, the combination of a main frame, a track frame having spaced portions, one of which has a universal movable connection with respect to said main frame and the other of which has a slidable and pivotal connection with respect to said main frame whereby said frames are interbraced and the transmission of twisting strains therebetween is minimized.

23. In a crawler tractor, the combination of a main frame, a track frame having spaced portions, one of which has a pivotal connection with respect to said main frame and the other of which has a slidable connection permitting substantial and positive sliding movement with respect to said main frame whereby said frames are interbraced and the transmission of twisting strains therebetween is minimized during travel of the tractor.

24. In a crawler tractor, the combination of a main frame, a track frame having spaced portions with connections to said main frame permitting relative pivotal movement between said frames in a vertical plane, one of said connections including a slidable connection permitting relative slidable movement between said frames in a fore and aft direction, said main and track frames having a third connection distinct from said other two connections permitting relative slidable movement between said frames in an up and down direction for holding said frames parallel during travel of the tractor.

25. In a crawler tractor, the combination of a main frame, a track frame at each side of said main frame, each of said track frames having spaced portions with connections permitting relative movement between said frames, one of said spaced portions of each track frame having a slidable connection permitting relative slidable movement with respect to said main frame in one direction, said track frames each having another slidable connection with respect to said main frame to permit a substantial movement of said track frame and whereby said track frames and main frame are held in parallel relationship, and an equalizer operatively associated with said main frame and track frames and being independent of said slidable connections.

26. In a crawler tractor, the combination of a longitudinal track frame having spaced rearwardly extending portions adapted to be movably connected with a main frame of the tractor, one of said rearwardly extending portions having a clamp bracket with a slideway to permit substantial guided linear movement and other than pivotal movement, said bracket being so constructed and arranged to provide one surface adapted to cooperate with said slideway and another surface adapted to cooperate in forming a pivotal connection with respect to said main frame.

27. In a crawler tractor, the combination of a longitudinal track frame having spaced rearwardly extending portions adapted to be movably connected with a main frame of the tractor, one of said rearwardly extending portions having a clamp bracket with a slideway to permit substantial movement other than pivotal movement, and a member included in said bracket having one surface adapted to cooperate with said slideway and another surface adapted to cooperate in forming a pivotal connection with respect to said main frame.

28. In a crawler tractor, the combination of a main frame, track frames at either side of said main frame, an equalizer for supporting a portion of said main frame on said track frames, the ends of said equalizer being slidably supported with respect to said track frames, slide and guide means adjacent said equalizer connecting said main and track frames to maintain same in parallel relationship and permitting only relative up and down movements therebetween, and a universal connection interposed between each of said track frames and said main frame and longitudinally spaced with respect to said means whereby the transmission of twisting strains between said frames is minimized.

29. In a crawler tractor, the combination of a main frame, track frames at either side of said main frame, an equalizer for supporting a portion of said main frame on said track frames, the ends of said equalizer being slidably supported with respect to said track frames, means adjacent said equalizer for connecting said main and track frames to maintain same in parallel relationship and permitting only relative up and down movements therebetween, a universal connection interposed between each of said track frames and said main frame and longitudinally spaced with respect to said means whereby the transmission of twisting strains between said frames is minimized, and a slidable connection laterally spaced from said universal connection interposed between other portions of each of said track frames and said main frame cooperating with said other connections in maintaining a suitable, flexible relationship between said main and track frames.

30. In a crawler tractor, the combination of a main frame, a track frame, and three separate means operatively connecting said frames at three spaced points, one permitting universal relative movement therebetween, another permitting relative pivotal and linear movements therebetween, and the other permitting only relative linear movements therebetween, whereby rigidity of the combined structure is maintained in certain directions and minimizing the transmission of twisting strains between said frames.

31. In a crawler tractor, the combination of a main frame, a track frame supporting said main frame and having spaced portions with coaxial connections between said frames permitting vertical movement between such frames, one of said connections being constructed to provide both a positive pivotal and a positive slidable movement between said frames in a fore and aft direction during travel of the tractor.

32. In a crawler tractor, the combination of a main frame, a track frame supporting said main frame and having spaced portions with coaxial connections between said frames permitting relative vertical movement between such frames, one of said connections being constructed to permit a positive linear movement between said frames in a fore and aft direction during travel of the tractor.

33. In a crawler tractor, the combination of a main frame, track frames at either side of said main frame, an equalizer intermediate the ends of said main frame and having a load supporting relation with said main frame for supporting a portion of said main frame on said track frames, the ends of said equalizer being slidably supported with respect to said track frames, and slide and guide means adjacent said equalizer and distinct therefrom connecting said main and track frames to maintain same in parallel relationship and permitting only relative up and down movements therebetween.

EDWARD A. JOHNSTON.